L. H. EICHELBERGER.
METHOD OF MIXING CONCRETE AND THE LIKE.
APPLICATION FILED MAY 21, 1913.
1,097,084.
Patented May 19, 1914.
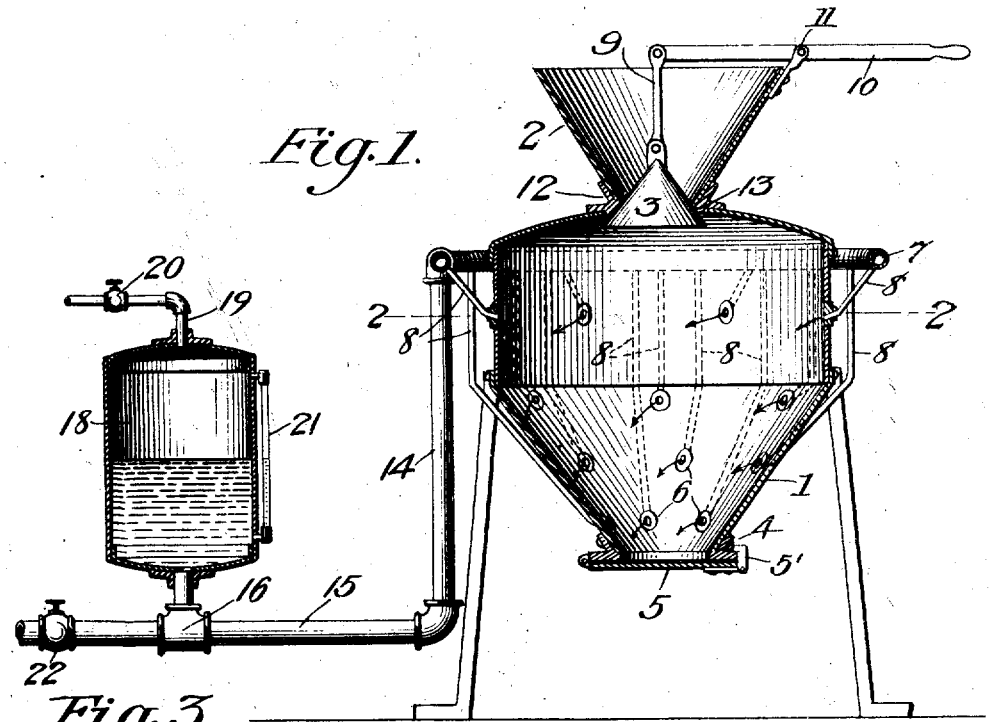
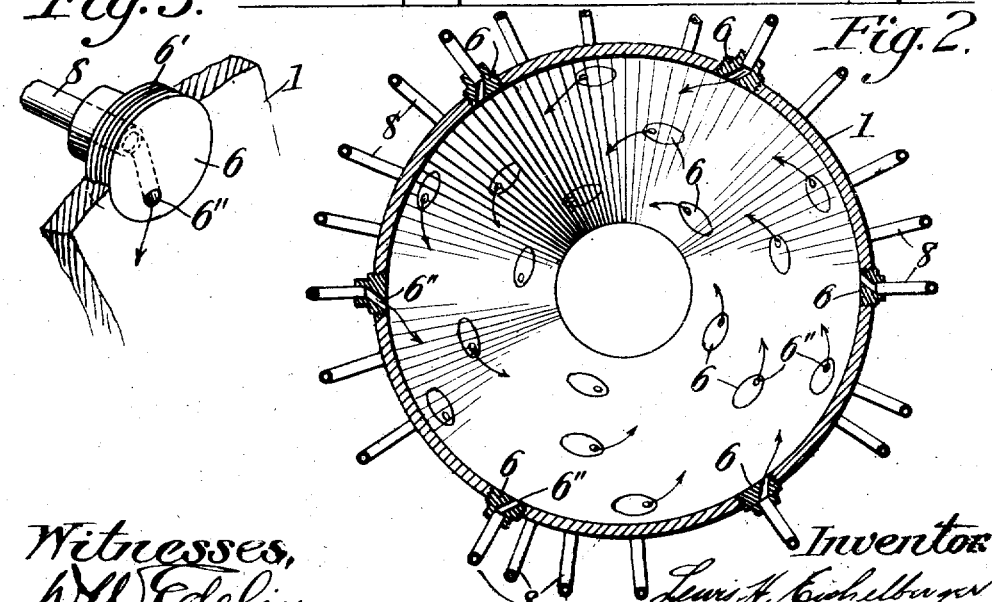

UNITED STATES PATENT OFFICE.

LEWIS HAY EICHELBERGER, OF BALTIMORE, MARYLAND.

METHOD OF MIXING CONCRETE AND THE LIKE.

1,097,084.   Specification of Letters Patent.   Patented May 19, 1914.

Application filed May 21, 1913. Serial No. 769,029.

*To all whom it may concern:*

Be it known that I, LEWIS HAY EICHELBERGER, a citizen of the United States, residing in the city of Baltimore, State of Maryland, have invented certain new and useful Improvements in Methods of Mixing Concrete and the like; and I do hereby declare the following to be a full, clear, and exact description of the invention, such as will enable others skilled in the art to which it appertains to make and use the same.

The invention relates to the mixing of concrete and similar materials and has for its object to provide a novel method for effecting the thorough admixture of the ingredients in the shortest possible time and with a minimum expenditure of power and a practically negligible amount of wear and tear on the apparatus involved. To these ends, the invention contemplates the feeding of the constituents of the mixture, in properly measured quantities, and preferably in a dry state, to a receptacle and subjecting the mass of the ingredients to the action of multiple jets of fluid under pressure which are so controlled and directed with respect to the mass as to produce and maintain a vortical whirling movement of said mass, so that all of the individual particles of the mass are thoroughly commingled. Preferably the fluid jets consist of air under pressure in which is entrained sufficient moisture for the given mass of materials to be mixed, and said moisture-laden air jets are delivered into the receptacle containing the mass to be mixed by means of jetting nozzles, which may be conveniently located in successive circumferential rows in the walls of the receptacle, with the discharge orifices of said nozzles so disposed as to direct the fluid jets in the same general direction, substantially parallel with the walls of the container and generally tangential to the path of movement of the material to be mixed.

A simple form of apparatus for carrying out the invention is illustrated in the accompanying drawings, in which, Figure 1 is a cross section or elevation of the complete apparatus. Fig. 2 is a horizontal section on line 2—2 of Fig. 1. Fig. 3 is an enlarged perspective view of a section of the container illustrating one of the adjustable jet nozzles.

Referring to the drawings, 1 indicates a receptacle or container, preferably made of metal, the main cylindrical body portion of which is provided with a conical or tapered lower section 1' having a central discharge outlet, closed by a hinged door 5, which may be of any convenient form, and which may be locked in place by a suitable catch as 5'. The closure 5 is preferably mounted upon a reinforcing flange 4 which is secured to the container about the discharge outlet. The upper or top portion of the container 1 has secured centrally thereto, by means of flanged ring 12, a conical feed hopper 2, the discharge end of which is closed by a conical valve or gate 3, seating against the inner peripheral face of the flanged ring 12, said valve or gate 3 being operated by means of a handle 10 pivoted at 11 to the edge of the hopper and connected to the gate 3 by link 9. The said hopper and its associated gate 3 afford a simple and effective means for measuring and feeding the constituents of the concrete or the like to the mixing chamber 1, as will be understood.

Disposed in circumferential rows in the walls of the mixing chamber 2 is a series of plugs 6, provided with circumferential screw threads engaging corresponding tapped openings in the walls of said container. Each of said plugs is provided with a jet opening or passage 6'' which is axially disposed in the outer end of said plug and is inclined or bent at its discharge end so as to direct a jet of fluid supplied to the passage substantially parallel with the inner wall of the container or mixing chamber. Each of the plugs 6 is provided at its outer end with a fluid supply pipe 8, which in turn is connected with an annular manifold 7 which surrounds the mixing chamber 1 and is in turn connected by pipes 14 and 15 with a suitable supply of air under pressure, said pipe 15 being provided with a valve 22 to regulate and control the air pressure. As indicated, the several jets plugs 6 are adjustable in the side walls of the mixing chamber so that the jets delivered by the passages 6'' may all be adjusted in the same general direction relative to the walls of the mixing chamber or container.

In mixing ordinary concrete, consisting of broken stone, sand and cement, a satisfactory adjustment of the jet nozzles is that indicated in the drawings, in which the fluid pressure jets from the nozzles are delivered in a direction generally tangential to the inner wall of the container and with an inclination in a downward direction. By adjusting the individual plugs 6 circumferentially, it is obvious that the degree of inclination of the jet orifices 6'' may be nicely regulated to produce the most effective and economical disposition of the jets in respect of the material to be mixed. It will be noted, however, that whatever the vertical inclination of the individual jets is, the general direction of the jets will be substantially parallel with the interior walls of the mixing chamber or container so that said jets set up a whirling or vortical movement in the mixing chamber. In actual practice, it has proven highly efficacious to supply the necessary water to secure the proper mixing of the concrete, along with the air under pressure, which effects the mixing operation. To accomplish this purpose, there is provided a water reservoir or receptacle 18, which is connected by a suitable union 16 with the air supply pipe 15, said tank 18 being likewise connected with a water supply pipe 19 provided with a shut-off valve 20. A suitable gage 21 is connected with said tank to measure and indicate the necessary quantity of water to be admitted to said tank to effect proper admixture with a given batch of concrete in the mixing chamber.

In carrying out the improved method of mixing concrete, with an apparatus of the character described, the dry materials to be mixed are dumped into the hopper 2, which, as indicated, may effectively serve as a measure for the individual ingredients, and are then delivered into the mixing chamber 1 by opening the gate or valve 3 in the bottom of the hopper, by means of handle 10. After the ingredients for the desired batch of concrete or similar mixture have been delivered from the hopper 2 into the mixing chamber 1, the valve 3 is preferably closed. The lower discharge gate 5 of the mixing chamber is normally closed. The requisite quantity of water for admixture with the given quantity of concrete material is then admitted to tank 18, the water supply being cut off as soon as the gage 21 indicates that the proper amount of water has been admitted to said tank. This water supply occupies the tank 18 and pipes 15 and 14, ahead of the cut-off valve 22. Thereafter air under pressure is admitted by opening valve 22 and permitting the air to pass from a suitable reservoir, by way of pipes 15, 14, circular manifold 17, individual supply pipes 8 to the jet nozzles or plugs 6 and thence into the mixing chamber. The air under pressure passing along pipes 15 and 14 entrains the water therein and carries or forces the same with it out of the jet nozzles 6 and into the mass of material in the mixing chamber. The continued flow of air under pressure through the pipes 14 and 15 takes with it all of the body of water from the tank 18 and injects the same into the mass of concrete material. The effect of this operation is the injection into the mass of material contained in the mixing chamber a multiplicity of powerful jets of compressed air heavily laden with moisture, the jets being so directed into the mass as to produce and maintain a vortical whirling movement of the entire mass, so that the materials are intimately admixed. While the air jets alone would be effective for producing this rotary mixing action of the mass, it is found that by loading the air with moisture, the swirling action is more quickly produced in the mass, and moreover, the water is more evenly distributed to the materials. By directing the jets of moisture-laden air under pressure in a generally downward direction, as well as generally tangential to the inner walls of the mixing chamber, the whole body of the concrete materials is subjected to the centrifugal or vortical whirl so that the larger materials in the form of broken stone are caused to move about in the mass of the finer materials, such as cement, sand and water, and become thoroughly coated and impregnated therewith, while the finer materials forming the coating and binding agents for the broken stone are themselves intimately admixed. The mixing operation is effected rapidly and is most thorough. The whirling and agitating movement is taken up by the entire mass of materials and while subjected to the vortical whirling movement the materials are practically supported by the fluid jets so that the moving material does not come in contact with the walls of the mixing chamber and the latter are not subjected to the heavy wear which is incident to the use of ordinary tumbling drums and the like for mixing concrete. After the material has been thoroughly admixed, the discharge gate 5 is opened and the accumulated pneumatic pressure in the mixing chamber will suffice to force the mixture out of the said mixing chamber and into the carts, receptacles, or conveyers designed to receive the mixture.

It will be noted that the foregoing operation may be carried out with absolute certainty as to the proportions of the ingredients entering into the mixture, that the mixing may be effected with greater thoroughness and celerity than is possible with other forms of mechanical mixers and that the tendency of the apparatus to wear by abrasion, or become clogged with adhering material is practically eliminated.

While the direction of the fluid pressure jets has been defined as substantially parallel to the interior walls of the mixing chamber, it will be understood that this is only an approximate definition and the expres- ...on is intended to cover any direction applied to the jets, by the nozzles, which will be effective to set up a vortical whirling movement of the mass of materials to be mixed.

What I claim is:—

1. The method of mixing concrete and the like, which consists in feeding the constituents of the mixture to a container and subjecting the resultant mass to the action of multiple fluid jets so directed into the container as to produce and maintain a vortical whirling movement of the mass.

2. The method of mixing concrete and the like, which consists in feeding the constituents of the mixture to a container and subjecting the resultant mass to the action of jets of moisture-laden air so directed into the container as to produce and maintain a vortical whirling movement of the mass.

3. The method of mixing concrete and the like, which consists in feeding the constituents of the mixture to a container, entraining water sufficient for the mixture in a body of air under pressure, and directing the air under pressure and the entrained water into the mass in the form of multiple fluid jets so directed as to produce and maintain a vortical whirling movement of the mass.

In testimony whereof I affix my signature, in presence of two witnesses.

LEWIS HAY EICHELBERGER.

Witnesses:
JOHN W. HEWES,
WM. F. MULCAHY.